(12) United States Patent
Rimdzius et al.

(10) Patent No.: US 7,922,668 B2
(45) Date of Patent: Apr. 12, 2011

(54) AEROBIC SPA SYSTEM

(75) Inventors: Donald A Rimdzius, Addison, IL (US);
Rajeshwar Alwa, Lake Geneva, WI (US); James W McGinley, Barrington, IL (US)

(73) Assignee: Aerobic Water Works LLC, Schaumburg, IL (US)

( * ) Notice: Subject to any disclaimer, the term of this patent is extended or adjusted under 35 U.S.C. 154(b) by 1061 days.

(21) Appl. No.: 11/725,100

(22) Filed: Mar. 16, 2007

(65) Prior Publication Data
US 2008/0223788 A1   Sep. 18, 2008

(51) Int. Cl.
A61B 5/02 (2006.01)
C02F 1/68 (2006.01)
A61H 21/00 (2006.01)

(52) U.S. Cl. .......... 600/508; 600/520; 210/760; 607/82

(58) Field of Classification Search .............. 4/524–526, 4/528, 541.1, 541.4–541.6; 607/81–87, 96, 607/104, 107; 600/509, 519–521, 523; 210/760, 210/167.17
See application file for complete search history.

(56) References Cited

U.S. PATENT DOCUMENTS

| | | | |
|---|---|---|---|
| 4,043,913 A * | 8/1977 | Hintermeister | .......... 210/167.11 |
| 4,230,571 A | 10/1980 | Dadd | |
| 4,273,660 A | 6/1981 | Beitzel | |
| 4,628,908 A | 12/1986 | Dupont | |
| 5,024,766 A | 6/1991 | Mahmud | |
| 5,106,495 A | 4/1992 | Hughes | |
| 5,441,529 A * | 8/1995 | Dorsch | ........................... 607/82 |
| 5,547,584 A | 8/1996 | Capehart | |
| 5,607,593 A | 3/1997 | Cote et al. | |
| 5,665,228 A | 9/1997 | Leaverton et al. | |
| 5,674,312 A * | 10/1997 | Mazzei | ........................ 95/261 |
| 5,685,980 A | 11/1997 | Patapoff et al. | |
| 5,741,416 A | 4/1998 | Tempest, Jr. | |
| 6,132,629 A * | 10/2000 | Boley | ........................... 210/760 |
| 6,135,146 A | 10/2000 | Koganezawa et al. | |
| 6,317,903 B1 | 11/2001 | Brunelle et al. | |
| 6,342,154 B2 | 1/2002 | Barnes | |
| 6,357,727 B1 | 3/2002 | Cho | |
| 6,393,775 B1 | 5/2002 | Staschik | |
| 6,521,194 B2 | 2/2003 | Yeh | |
| 6,584,624 B2 | 7/2003 | Horwood et al. | |
| 6,602,425 B2 | 8/2003 | Gadgil et al. | |
| 6,673,248 B2 | 1/2004 | Chowdhury | |
| 6,681,417 B2 | 1/2004 | Brunelle et al. | |
| 6,684,648 B2 | 2/2004 | Faqih | |
| 6,688,048 B2 | 2/2004 | Staschik | |

(Continued)

OTHER PUBLICATIONS

Oxygen America, Inc.; photograph and description of "Clinic Grade Aquacizer"; Internet web site; http://www.oxygenamerica.com/ProductDetails.aspx?productID=447.

(Continued)

Primary Examiner — Niketa I Patel
Assistant Examiner — Catherine Voorhees
(74) Attorney, Agent, or Firm — Bishop & Diehl, Ltd.

(57) ABSTRACT

An aerobic spa system comprising a water source providing water, an ozone source providing ozone, an ozone introduction mechanism adapted to introduce at least some of the ozone into the water, an ozone saturation mechanism adapted to cause at least some of the ozone to be dissolved into the water, a substantially enclosed chamber receiving water containing dissolved ozone; and a user at least partially disposed inside the chamber who comes into contact with the water containing dissolved ozone.

32 Claims, 5 Drawing Sheets

U.S. PATENT DOCUMENTS

| | | |
|---|---|---|
| 6,698,039 B1 | 3/2004 | Park |
| 6,699,441 B2 | 3/2004 | Martin |
| 6,723,233 B1 | 4/2004 | Barnes |
| 6,763,606 B2 | 7/2004 | Saida |
| 6,767,453 B2 | 7/2004 | Lifschitz |
| 6,780,328 B1 * | 8/2004 | Zhang ............................ 210/663 |
| 6,827,910 B2 | 12/2004 | Chen |
| 6,863,827 B2 | 3/2005 | Saraceno |
| 7,559,095 B2 * | 7/2009 | Tei et al. ........................... 4/524 |
| 2001/0027573 A1 | 10/2001 | Gloodt |
| 2001/0042708 A1 | 11/2001 | Barnes |
| 2002/0151810 A1 * | 10/2002 | Wong et al. .................... 600/520 |
| 2003/0209502 A1 * | 11/2003 | Lacasse et al. ................ 210/760 |
| 2004/0000008 A1 | 1/2004 | Horwood et al. |
| 2004/0107496 A1 | 6/2004 | Brunelle et al. |
| 2004/0260364 A1 * | 12/2004 | Daffer et al. .................... 607/81 |
| 2004/0262206 A1 | 12/2004 | Gettman |
| 2005/0236338 A1 * | 10/2005 | Minnix ........................ 210/760 |
| 2007/0061051 A1 * | 3/2007 | Maddox ........................ 700/300 |
| 2008/0116136 A1 * | 5/2008 | Wilkins et al. ................ 210/650 |
| 2008/0116149 A1 * | 5/2008 | Dick et al. ..................... 210/760 |
| 2008/0127403 A1 * | 6/2008 | Iantorno et al. ................... 4/213 |
| 2008/0189847 A1 * | 8/2008 | Yamasaki et al. .............. 4/541.4 |
| 2008/0266118 A1 * | 10/2008 | Pierson et al. ............. 340/573.6 |
| 2009/0049597 A1 * | 2/2009 | Saitou et al. ...................... 4/524 |

OTHER PUBLICATIONS oxygenozone.com; photograph and description of Ultra pure Aquasizer Model 2000; Internet website; http://www.oxygenozone.com/ozone_bath.html.

* cited by examiner

AEROBIC SPA SYSTEM

BACKGROUND OF THE INVENTION

The present invention relates generally to an aerobic spa system, and more particularly, to a system for delivering many of the benefits of an aerobic workout and deep skin and body cleansing to a user while the user is partially disposed inside an enclosed heated chamber.

It is well known in the art that exposing a user to heat can elevate the user's heart rate and result in an aerobic work out. However, it is impractical to use existing systems such as saunas, steam rooms or hot tub to permit the user to view their heart rate over a period of time in graphical format. For example, it is impractical to equip a conventional steam room with a display monitor adapted to display the user's heart rate over a period of time—such as the touch-screen LCD display monitors used with elliptical trainers or other exercise equipment—because such display equipment is not adapted for use high heat or humidity conditions.

Further, existing systems such as steam rooms saunas, and hot tubs are not adapted to take advantage of the benefits of using water with saturated ozone ("ozonated water"). For example, it is possible to contribute to an aerobic workout by causing a user to be exposed to steam and heated ozonated water. Hydrotherapy spas equipped with ozone generators are well known in the art. However, such devices fail to maintain sufficient ozone concentration levels in contact with the user, thereby depriving the user of experiencing the benefits associated with such specially treated water. To achieve such purification and aerobic workout related benefits, it is necessary, however, to achieve an ozone concentration of greater than 0.5 milligram ozone per liter of water at 98 degrees Fahrenheit.

For some of the conventional devices, the failure to achieve sufficient ozone saturation in the water may be intentional because of the consequential excessive ozone content released into the ambient room air. Such excessive ozone content in the ambient room air creates a health risk related to inhaling air containing a high concentration of gaseous ozone. As such, some conventional devices may be intentionally designed with a weaker ozone generator used as a shortcut for avoiding exposing the user to a hazardous ozone concentration in the atmosphere.

For other conventional devices such as hot tubs and swimming pools, ozone may be added to sanitize a small flow of water which is recirculated into a high volume water basin into which the user is immersed. While saturated ozone levels may be high in the small contained flow of water that is ozonated, only a small percentage of the total volume of basin water is continually ozonated in this manner such that the average ozone concentration levels in the user basin water are low, typically less than 0.1 milligrams per liter, due to the short half-life of ozone in water. Thus, as a supplement to ozone sanitation, various disinfection chemicals are often added to maintain water quality.

While such conventional devices may be intentionally designed to achieve high ozone concentration levels by, for example, comprising a higher rated ozone generator, such devices nevertheless fall short because too low a percentage of the ozone molecules are actually saturated in the water while too high a percentage of the ozone molecules escape into the atmosphere as unsaturated gaseous ozone. In such a case, the user also fails to enjoy the benefits associated with adequate ozone saturation in the water. Moreover, such devices may also expose the user to a dangerous atmospheric ozone concentration.

As such, it is desirable to have an aerobic spa system capable of: (1) achieving sufficient ozone concentration levels whereby the user may experience the benefits of having their skin come into contact with sufficiently ozonated water, (2) inducing perspiration to open and facilitate the cleansing of the pores of the user's skin by using hot water or a combination of steam and hot water, (3) increasing the users heart rate for the benefits derived, while (4) minimizing the introduction of gaseous ozone into the atmosphere such that the user can avoid inhaling and being exposed to hazardous atmospheric ozone concentration levels. It is also desirable to have an aerobic spa system capable of permitting the user to view their heart rate levels over a period of time.

BRIEF SUMMARY OF THE INVENTION

An embodiment of the present invention includes partially disposing the user in an enclosed and heated chamber with the user's head projecting outside the chamber. It will also be appreciated that when the user is partially disposed inside a substantially enclosed chamber, it is possible for the user to achieve the benefits of ozonated water in an aerobic workout without being exposed to the risks associated with high atmospheric ozone concentration levels. It will also be appreciated that when the user is partially disposed inside a substantially enclosed chamber it is possible that the user can benefit from viewing a heart rate monitor that displays the user's heart rate over a period of time.

To create ozonated water, an embodiment of the aerobic spa system includes a water source providing water and an ozone source providing ozone gas. An ozone introduction mechanism, which may be in the form of a venturi, introduces the ozone gas into the water resulting in water containing dissolved and undissolved ozone. The water containing dissolved and undissolved ozone is delivered to an ozone saturation mechanism, which may be in the form of a contact tank, adapted to permit further dissolution of the ozone gas into the water. Water exiting the ozone saturation mechanism is delivered to a degas assembly.

The degas assembly separates the undissolved ozone—present in the form of bubbles—from the ozone molecules dissolved in the water. Undissolved ozone bubbles are delivered to a first ozone destruct mechanism which decomposes ozone molecules $O_3$ into oxygen molecules $O_2$ thereby preventing the off-gassing of undissolved ozone into the atmosphere.

Heated and deionized water containing dissolved ozone ("ozonated water") is delivered from the degas assembly to a substantially enclosed chamber where the user is located. A controlled account of steam is released inside the chamber to create a steam environment. The user applies the ozonated water to their body such that they may experience the variety of benefits associated with an aerobic workout and the cleansing properties of the ozonated and deionized water. The water application to the user inside the chamber may be by spray nozzles and/or by handheld spray wands. The user may also be permitted to adjust the temperature inside the bath chamber by actuating controls on a user control panel.

It will be appreciated that a control central processing unit ("CPU") makes it possible to automate control over the numerous components of the aerobic spa system. For example, based on instructions from the operator via an operator control panel the control CPU may be adapted to initiate a spa cycle by activating certain components in an automated manner.

BRIEF DESCRIPTION OF THE DRAWINGS

For the purpose of facilitating an understanding of the subject matter sought to be protected, there is illustrated in the accompanying drawings embodiments thereof, from an inspection of which, when considered in connection with the following description, the subject matter sought to be protected, its construction and operation, and many of its advantages, should be readily understood and appreciated.

DETAILED DESCRIPTION

Figure 1:
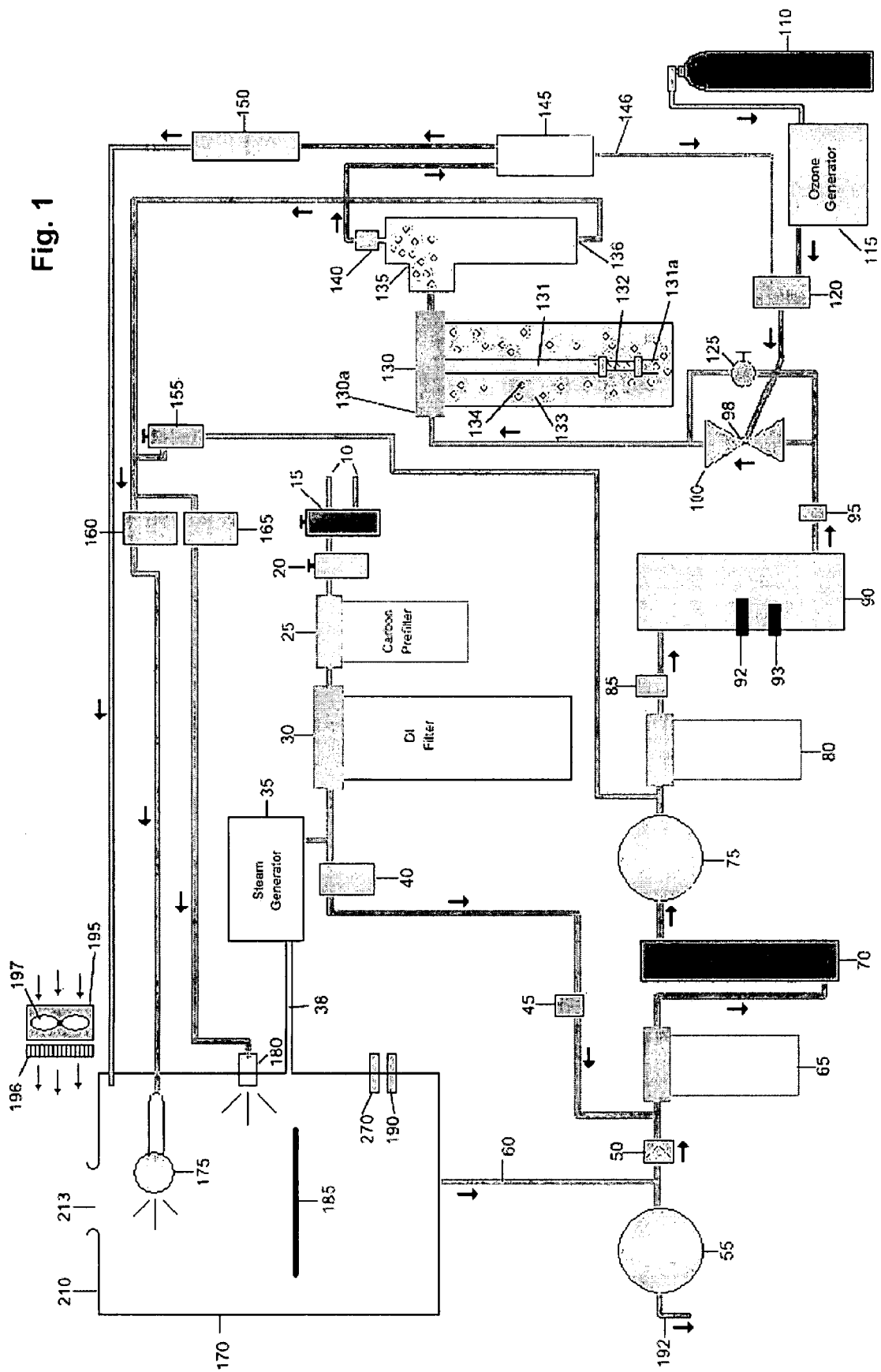
FIG. 1 is partial flow diagram of the aerobic spa system of the present invention.

Referring to FIG. 1, an embodiment of the aerobic spa system of the present application is shown. Each spa cycle requires less than ten gallons of purified water that is heated to an approximate temperature range of between 100 to 108 degrees Fahrenheit. The tap water purification process begins when water is introduced from a water source 10. The water source 10 may include hot and cold water inlet tubes carrying tap water from the municipal water system. The temperature and pressure of the water from water source 10 may be regulated with a standard thermostatic valve 15 and pressure regulator 20 in a well known manner.

Impurities in the water can reduce the absorption of ozone and reduce the purification effect on the user's skin, so it is critical to remove any impurities commonly found in tap water, such as minerals or chlorine, to the maximum extent possible. It will be appreciated that the water should be purified such that the total dissolved solid ("TDS") level is below 10 parts per million ("ppm") which is a small fraction of the TDS level of normal tap water. Treated municipal tap water is typically 200 to 400 ppm with some well water containing up to 2000 ppm. As such, the tap water that exits pressure regulator 20 will pass through a first prefilter 25, in the form of a particulate filter to aid in removing particulate impurities, and a first deionization filter (the "first DI filter") 30. DI filters are well known to those skilled in the art and can be purchased from a variety of manufactures and suppliers. While the deionization process is preferred over other water purification processes because it is capable of producing water with a TDS below 10 ppm, other water purification means may be used including distillation.

Some of the water exiting the DI filter 20 may be diverted to a steam generator 35. Steam generators are also available for purchase from a variety of manufacturers.

Purified water passes through supply valve 40 until the proper volume of water has been introduced into the system as indicated by the water level sensor 190 disposed within the chamber 170. After the desired water volume has been introduced into the system, the supply valve 40 closes such that no new water enters the system. During a spa cycle, water exiting the chamber 170 is pulled through outlet conduit 60 under the suction force of a second pump 75. Such water exiting the chamber 170 is prevented from exiting the entire system through drain 192 by virtue of a first pump 55. First pump 55 prevents the passing of water therethrough when the pump is deactivated. It will be appreciated that check valve 50, a one-way valve, permits water from the outlet conduit 60 to be recirculated back into the system. In that regarding the water from the conduit 60, rather than exiting the system through the 192 is recaptured and routed through the second prefilter 65.

Water from the first DI filter 30 and/or water from the chamber outlet conduit 60 is combined and pumped through a second prefilter 65 in the form of a particulate filter, which aids in removing particulate impurities, and UV sterilizer 70, which aids in destroying bacteria and other impurities that may have passed from the user (not shown) in the chamber 170. A second pump 75, in the form of a vane or impeller pump, creates a pressure rise in the water such that the water may continue through the system.

Water from the second pump 75 is passed through a second DI filter 80, where the water is further stripped of dissolved solids that may have passed from the user in chamber 170. The water then passes into a water heater 90 where the purified deionized water is heated to a desired temperature. The water heater 90 may include a water pressure switch 92 and maximum temperature switch 93, adapted to prevent the water heater element from overheating in-case of a malfunction. Water is circulated through the system until a desired temperature is reached as indicated by the temperature sensor 95.

The next step is to introduce at least some gaseous of the ozone into the purified water to create ozonated water. It will be appreciated that the present invention is capable of generating ozonated water containing greater than 0.5 milligram ozone per liter as it contacts the user. Gaseous ozone is initially injected into the water using an ozone introduction mechanism 100. The ozone introduction mechanism 100 may be in the form of a venturi, which is well known in the art, or any mechanism that causes gaseous ozone to be saturated in water. Gaseous ozone is generated using an ozone generator 115. Ozone generation is well known to those skilled in the art and ozone generators such as an insulated plate corona discharge ozone generator 115 are available for purchase from a variety of manufacturers and suppliers. The ozone generator 115 draws concentrated O2 molecules from an oxygen source such as oxygen tank or oxygen concentrator 110 or in lower concentrations directly from the atmosphere and transforms a portion of the O2 molecules from the oxygen source 110 to O3 molecules such that a percentage of the oxygen atoms, by weight, exiting the ozone generator 115 are in the form of O3 molecules, leaving the remainder of the oxygen atoms in the form of O2 molecules. The gas exiting the ozone generator passes through the venturi inlet solenoid valve ("VISV") 120 towards the ozone introduction mechanism 100.

An ozone introduction mechanism 100 initiates the introduction of ozone into the water flow. The ozone introduction mechanism 100 includes a narrow opening 98, which causes a pressure drop in the water flowing through. The gaseous mixture containing ozone is injected to the water flow substantially near the narrow opening 98 where the pressure drop occurs. A needle valve 125 may be set to adjust the desired pressure drop across the ozone introduction mechanism 100 and to regulate the water pressure of the water entering the ozone introduction mechanism 100 by permitting water to bypass the ozone introduction mechanism 100.

The water exiting the ozone introduction mechanism 100 (hereinafter the "first mixture") will contain ozone dissolved in water ("ozonated water") and undissolved ozone. Any undissolved ozone present in the first mixture will be in the form of bubbles. From the ozone introduction mechanism 100, the first mixture travels to an ozone saturation mechanism 130. It will be appreciated that the ozone saturation mechanism 130 may be in the form of a contact tank having an inner conduit 131, mixer 132 and outer conduit 133 is adapted to cause a greater percentage of the ozone to be dissolved or saturated into the water. The contact tank 130 also includes a cap 130a. The first mixture passes in a downward direction through the inner conduit 131 into the mixer 132. The blades in the mixer 132 create turbulent flow dividing any bubbles into smaller bubbles, thereby increasing the opportunity for ozone to come into contact with and dissolve into the water. After exiting the mixer 132, the first mixture continues traveling downwardly through inner conduit 131 through an opening 131a, then upwardly through outer conduit 133. It will be appreciated that the first mixture travels faster through the inner conduit 131 than the outer conduit 133 because the inner conduit 131 has a smaller diameter. As such, in traveling up the outer conduit 133 at a slower rate, unsaturated ozone bubbles 134 present in the first mixture are permitted more time to saturate into water. The additional time also permits the saturated ozone in the water to destroy bacteria, chemicals, and other substances that may have passed from the user in the chamber 170. It will be appreciated that the ozone saturation mechanism 130 may take many forms, including, but not limited the form of a simple tank, long hose or tube, whereby unsaturated ozone bubbles 134 present in the first mixture are permitted sufficient time to saturate in water.

The first mixture then travels to the degas assembly 135 which separates the unsaturated ozone bubbles 134 from the ozonated water by permitting any ozone bubbles to float, by gravity, to the top and exit the degas assembly 135 though degas valve 140. The mostly gaseous mixture exiting the degas valve 140 (hereinafter, the "second mixture") includes air, gaseous ozone and a small amount of water. The water separator 145 permits any water present in the second mixture to separate and fall through the water separator conduit 146 towards the VISV valve 120. The VISV valve 120 toggles automatically to permit excess water from the second mixture to be recirculated back though the ozone introduction mechanism 100 130.

The second mixture may contain a high residual gaseous ozone concentration. Thus, any excess gaseous ozone that escapes from the second mixture is destroyed using a first ozone destruct mechanism 150. The gaseous portion of the second mixture travels from the water separator 145 to the first ozone destruct mechanism 150. The first ozone destruct mechanism 150 is a tube-shaped chamber packed with substantially porous catalytic material. The porous catalytic material (not shown) creates substantial surface area for the ozone to come into contact with, such that the ozone molecules react with the catalyst and are reconverted into oxygen molecules, which are relatively stable. It will be appreciated that the first ozone destruct mechanism 150 can take many forms, including, but not limited to, an activated carbon chamber or high temperature heat chamber, also adapted to destroy ozone molecules. Oxygen molecules exiting the first ozone destruct mechanism 150 travel through a conduit towards the chamber 170 to increase the oxygen content of the air in the chamber 170. Alternatively, The gaseous portion of the second mixture may be vented away from the chamber location via a duct to the exterior to prevent gaseous ozone build up.

Meanwhile, while the second mixture exits the degas assembly 135 through the degas valve 140, the ozonated water, by force of gravity and pressure from the second pump 75, exits the degas assembly through an opening 136 disposed at the bottom of the degas assembly 135.

Figure 2:
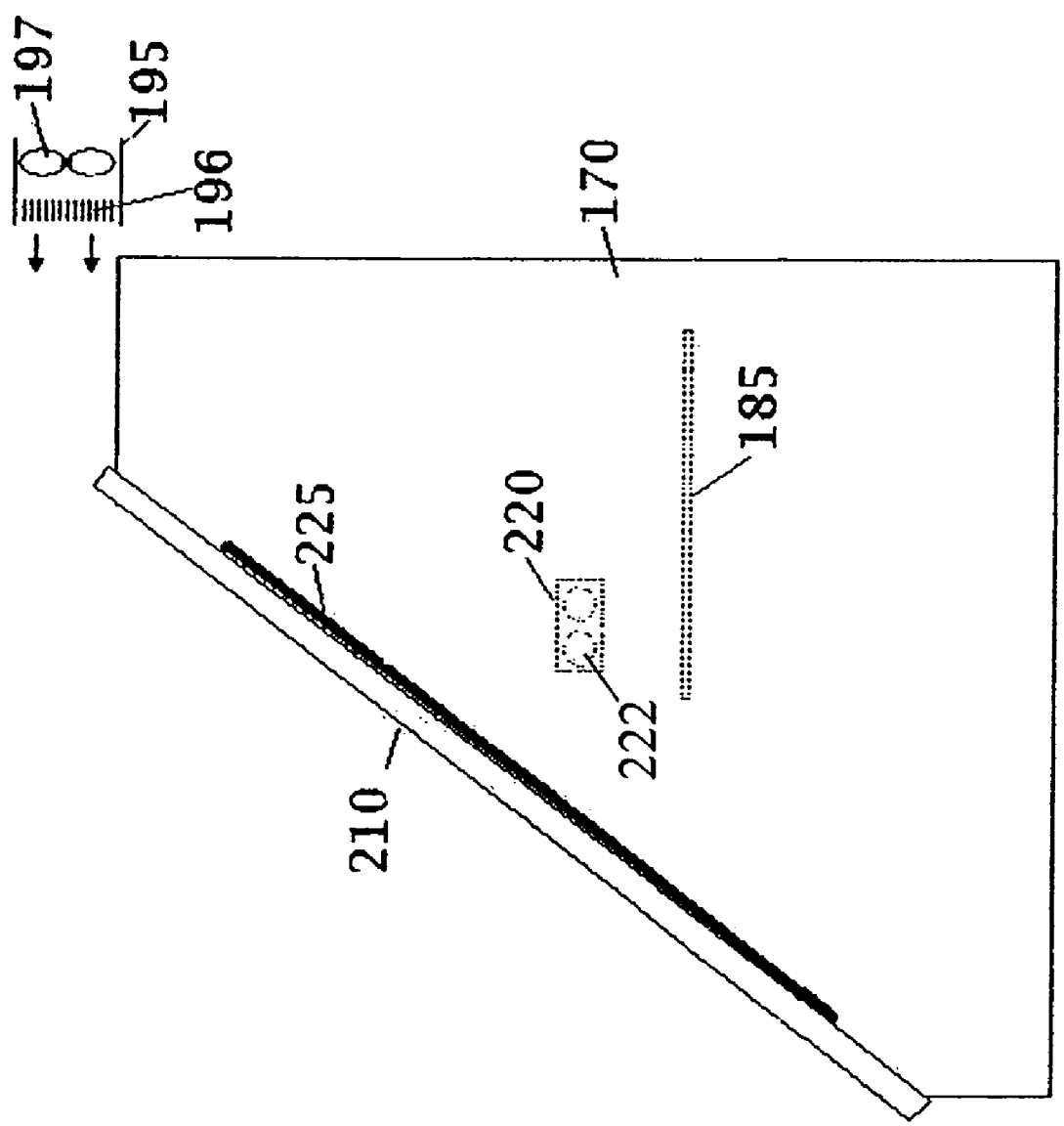
FIG. 2 is a side elevation view of a chamber of the present invention.
Figure 3:
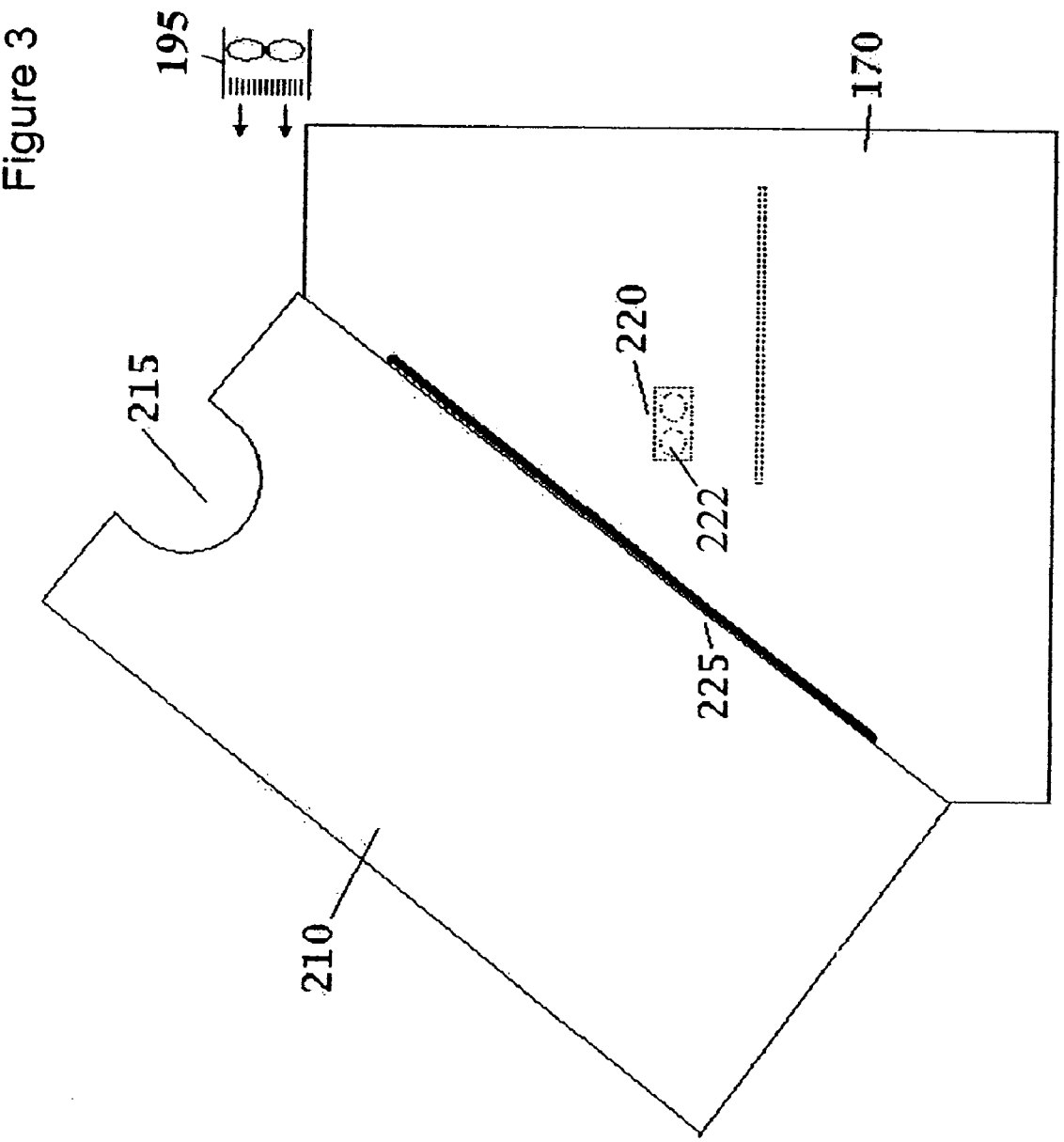
FIG. 3 is a side elevation view of the chamber of FIG. 2, with the door opened.

The user typically enters the chamber 170 once the ozonated water received by the chamber 170 has reached an approximate temperature range of between 100 to 108 degrees Fahrenheit. It will be appreciated that the aerobic spa system of the present application seeks to deliver the beneficial effects of ozone to the user by causing deionized ozonated water to contact the user's skin, while simultaneously ensuring that the user does not breath unsafe levels of residual ozone gas The levels of ozone in the water contacting the user in the Aerobic Spa are significantly higher than the levels in swimming pools, hot tubs and other such devices that may use ozone to sanitize the water. The higher ozone levels in the ozonated water also serve the additional purpose and benefit of significant antibacterial, antifungal and antiviral action directly on the user's skin. As shown in FIGS. 2-3, the chamber 170 is partially enclosed.

Means for enclosing the chamber may include a hard cover 210 that pivots between an open and closed position using a hinge 225. The cover 210 includes an opening 215 adapted to fit around the user's neck so the user's head may be disposed outside the chamber 170 while the rest of the users body is disposed within the chamber 170.

The trapezoidal shaped chamber 170 is but one embodiment for delivering ozonated water to a user. It is to be understood that the aerobic spa may be adapted for other types of chambers or spas such as a shower stall, where the user would be permitted to stand up. It will also be appreciated that the aerobic spa may be equipped to use a variety of types of shower heads, nozzles, or outlets into an area that may or may not provide for water drainage.

In operation, ozonated water exiting the degas assembly 135 through the opening 136 travels through a first solenoid valve 160, then enters the chamber 170. The ozonated water may enter the chamber 170 through a first jet 175, which may be in the form of a series of jets, standard shower nozzle or specialized shower nozzle having a variety of capabilities, such as being detachable or creating a water massage. After entering the chamber 170, the user assumes a seated position on the seat 185 and manually pivots the cover about the hinge 225 to the closed position. Once seated in the chamber 170, the user's head remains disposed outside the chamber 170. When the user is seated in the chamber, an operator may choose to wrap a towel around the user's neck to further create a seal adjacent to the opening 215. In an alternate embodiment a gasket or other sealing member may be used to help retain the steam inside the chamber. During a spa cycle, the user may actuate a user console 220, provided inside the chamber 170, to control the desired water temperature. In an embodiment, the user console includes air pressure buttons 222, that, when actuated, send a surge of air pressure to air pressure sensors (not shown). The use of air pressure buttons 222 eliminates the hazards associated with electrical wire coming into contact with water.

A residual amount of gaseous ozone will be released from the ozonated water as it is sprayed within the chamber due to the turbulence the water undergoes as it contacts the user. It will be appreciated that a substantial portion the gaseous ozone released from the ozonated water in the chamber will be quickly neutralized converted into oxygen molecules due to the hot steam environment. However, it is still possible for some of the oxygen atoms to escape the chamber 170 in the form of gaseous ozone through the opening 210. As such, a second ozone destruct mechanism 195 in the form of an ozone destruct fan assembly is disposed adjacent to the chamber 170, to convert any such gaseous ozone into oxygen to prevent the ambient ozone concentration from exceeding safe levels. Similar to the first ozone destruct mechanism 150, the second ozone destruct mechanism 195 serves as a catalyst to destroy ozone by converting ozone molecules into oxygen molecules. The second ozone destruct mechanism 195 includes a grill 196 comprised of substantially porous and/or honeycomb-like catalytic material and fan blades 197, causing the ozone molecules colliding with the catalytic material 196 to be neutralized by conversion into oxygen molecules. The second ozone destruct mechanism 195 may be adapted to direct airflow in a direction whereby the user may avoid breathing residual ozone molecules before they are neutralized. It will be appreciated that in an alternate embodiment, the second ozone destruct mechanism may be in the form of a vent or aperture, whereby gaseous ozone may be vented out of the chamber 170 and directed away from the user, in a manner similar the way exhaust from a clothing dryer is vented out of a house.

Steam produced by the steam generator 35 is delivered to the chamber 170 through a steam conduit 38. It will be appreciated that the presence of steam in the chamber 170 further permits the temperature of the chamber 170 to be elevated, which, in-turn, causes the user's heart rate to be elevated, thereby further effectuating an aerobic work out.

During the course of the spa session, water exiting the chamber 170 through the chamber outlet 60 is recycled back into the system to be re-purified. Further, the water exiting the chamber 170 must also be re-ozonated because the ozone in the water is partially spent in the process of reacting with the bacteria and other substances excreted and flushed off the user's skin.

The aerobic spa system also provides for a cleaning cycle after the user exits the chamber. During a cleaning cycle, some of the water from second pump 75 may be diverted through a second solenoid valve 165 towards a second jet 180, which, similar to the first jet 175, may be in the form of a series of jets. It will be appreciated that the second jet 180 will spray purified, ozonated water into the chamber 170 and onto the seat to permit the chamber 170 to be cleaned and sanitized between spa sessions. It will also be appreciated that at the end of a spa session, a check valve 50 will close, and the first pump 55 will run to expel all water from the system through the drain 192, whereby the next user may start the next spa session with new water from the water source 10.

Figure 4:
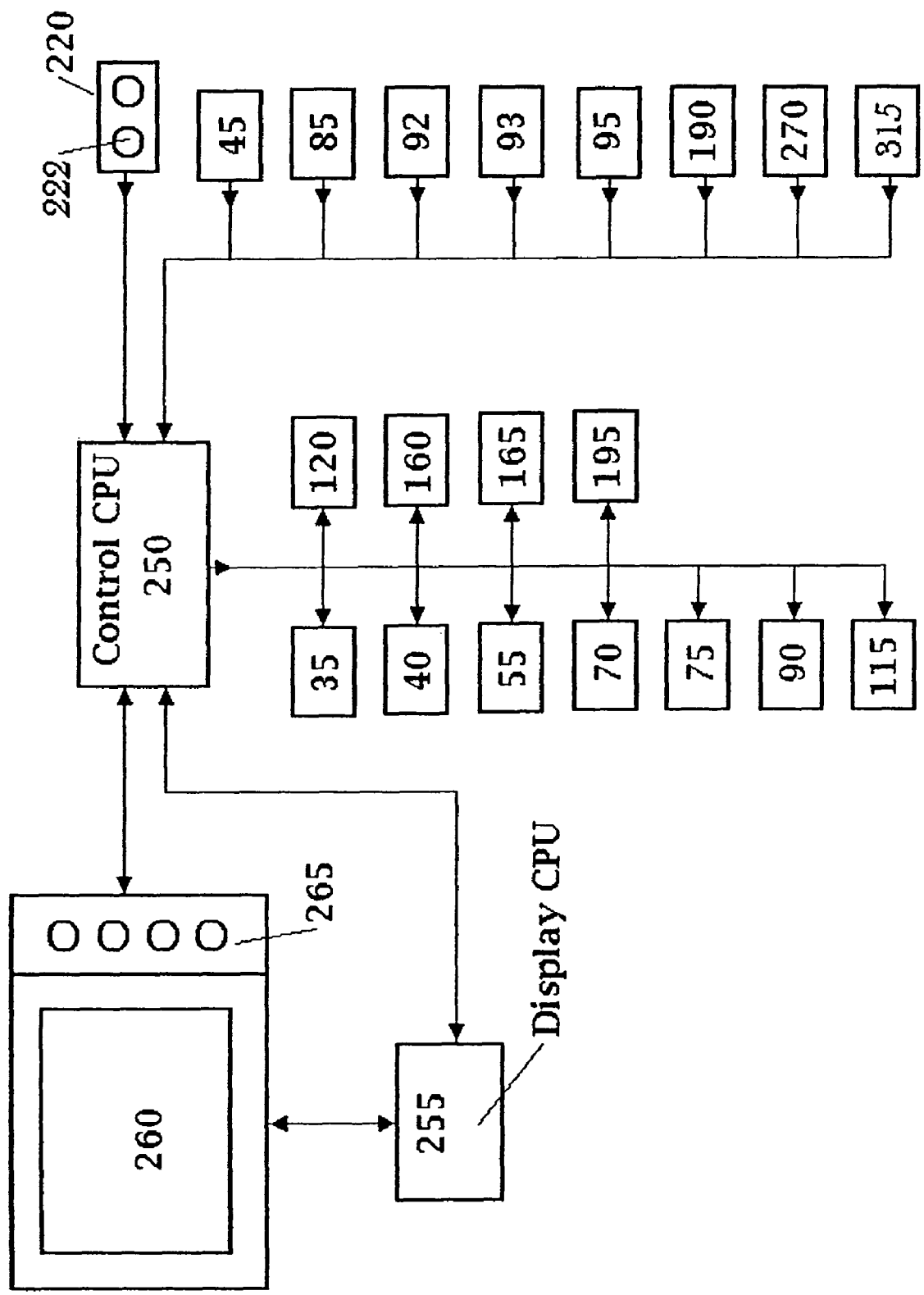
FIG. 4 is a flow diagram depicting the functions of a control panel of the present invention.

Referring to FIG. 4, operation of a central processing unit the ("control CPU") 250 of the present invention is shown. It will be appreciated that the control CPU 250 may be adapted to automate initiation of a spa cycle. In that regard, an operator, not shown, may actuate button controls 265, adjacent to an operator control panel 260 having a display CPU 255, to instruct the control CPU 250 to begin initiation of a spa cycle. Next, the control CPU 250 instructs, via a data signal, the supply valve 40 to open. The operator control panel 260 may include a touch screen display, in-place of, or in addition to, the button controls 265.

The control CPU 250 may receive data signals from a water level sensor 190, disposed adjacent to the chamber 170, indicating that a desired water level in the chamber 170 has been reached, whereby the control CPU 250 may instruct the supply valve 40 to close. Further, the control CPU 250 may be adapted to receive data signals from an overflow sensor 270, disposed adjacent to the chamber 170 and above the water level sensor 190, indicating that the chamber is at risk of overflowing, whereby the control CPU 250 may instruct various components throughout the system to take appropriate actions.

It will be appreciated that the control CPU 250 makes it possible to automate the control of numerous components of the aerobic spa system. For example, based on instructions from the operator via the operator control panel 260, the control CPU 250 may be adapted to automatically activate or deactivate components such as the steam generator 35, UV sterilizer 70, second pump 75, ozone generator 115, VISV 120 and/or second ozone destruct mechanism 195. In addition, the operator may use the operator control panel 260 to pre-program the desired water temperature or the time duration of a spa cycle.

As shown, the user control 220 may send data, such as desired temperature settings, to the control CPU 250. The control CPU 250 can store the desired temperature settings and send a signal to shut off the water heater 90 when the temperature sensor 95 indicates the desired temperature has been reached. It will be appreciated that, to prevent a short circuit or electrocution risk, the user console 220 uses air pressure, rather than electrical signals, to signal the desired temperature to the control CPU 250. In that regard, the user console includes air pressure buttons 222, that, when actuated, send a surge of air pressure to air pressure sensors (not shown) disposed adjacent to and in communication with the control CPU 250.

The control CPU 250 may also be adapted to prevent the water heater 90 from overheating. In that regard, the control CPU 250 may receive data signals from a water pressure switch 92, disposed adjacent to the water heater 90. If the water pressure in the water heater 90 drops below a desired value as indicated by the water pressure switch 92, the control CPU 250 may instruct the water heater 90 to deactivate to avoid overheating. In a similar manner, the control CPU 250 may be adapted to receive data signals from a maximum temperature switch 93, whereby the control CPU 250 may instruct the water heater 90 to deactivate if the maximum temperature switch 93 indicates that a threshold temperature has been exceeded.

The control CPU 250 may also be adapted to initiate a cleaning cycle. For example, an operator may initiate a cleaning cycle by actuating controls on the operator control panel 260. Upon being instructed to initiate a cleaning cycle, the operator control panel 260 sends a data signal to the control CPU 250 via the display CPU 255. Next, the control CPU 250 instructs the first solenoid value 160 to close and the second solenoid valve 165 to open, whereby water may be diverted towards the second jet 180. As such, the second jet 180 may spray purified, ozonated water into the chamber 170 and onto the seat 185. It will also be appreciated that the control CPU 250 may instruct the first pump 55 to activate, whereby all water may be expelled from the system.

The control CPU 250 may also be adapted to inform the operator, via the operator control panel 260, if the first DI filter 30 or second DI filter 80 need to be replaced. In that regard, a first total dissolved solid sensor ("first TDS sensor") 45, disposed adjacent to the first DI filter 30, may monitor the dissolved solids exiting the first DI filter 30, and signal a warning to the control CPU 250 when the level of dissolved solids has crossed a pre-determined threshold. A second TDS sensor 85, disposed adjacent to the second DI filter 80, may monitor the dissolved solids exiting the second DI filter 80 in a similar manner.

A user may fit an elastic chest strap 300 around their chest with a heart rate sensor 305, which may be in the form of a plurality of sensors, disposed therein. A small battery powered wireless transmitter 310 coupled to the heart rate sensor 305, and also disposed inside of or adjacent to the chest strap 300, transmits wireless heart rate data 317 signals to a wireless receiver 315 disposed outside the chamber and coupled to the display CPU 255. The display CPU 255 logs heart rate data 317 over the duration of a spa cycle and displays the heart rate on a heart display monitor. It will be appreciated that the heart display monitor and touch screen display panel 260 can be one and the same. It will be appreciated that the heart rate data 317 may be used to automatically adjust the water temperature, steam level and/or other operating parameters of the aerobic spa system such that the user receives the maximum benefit without becoming overexerted or overheated during a spa cycle. For example, the user's age, sex, physical condition or other pertinent attributes may be entered into the touch screen display panel 260 to provide the display CPU 255 and control CPU 250 heart rate threshold information, which could be used to control the operating parameters of the aerobic spa system in an automated manner. In that regard, if the user's heart rate data 317 indicates too high a level of exertion, the control CPU 250 may instruct the water heater 90 to deactivate in a manner that permits the water temperature to decrease or deactivate altogether.

Figure 5:
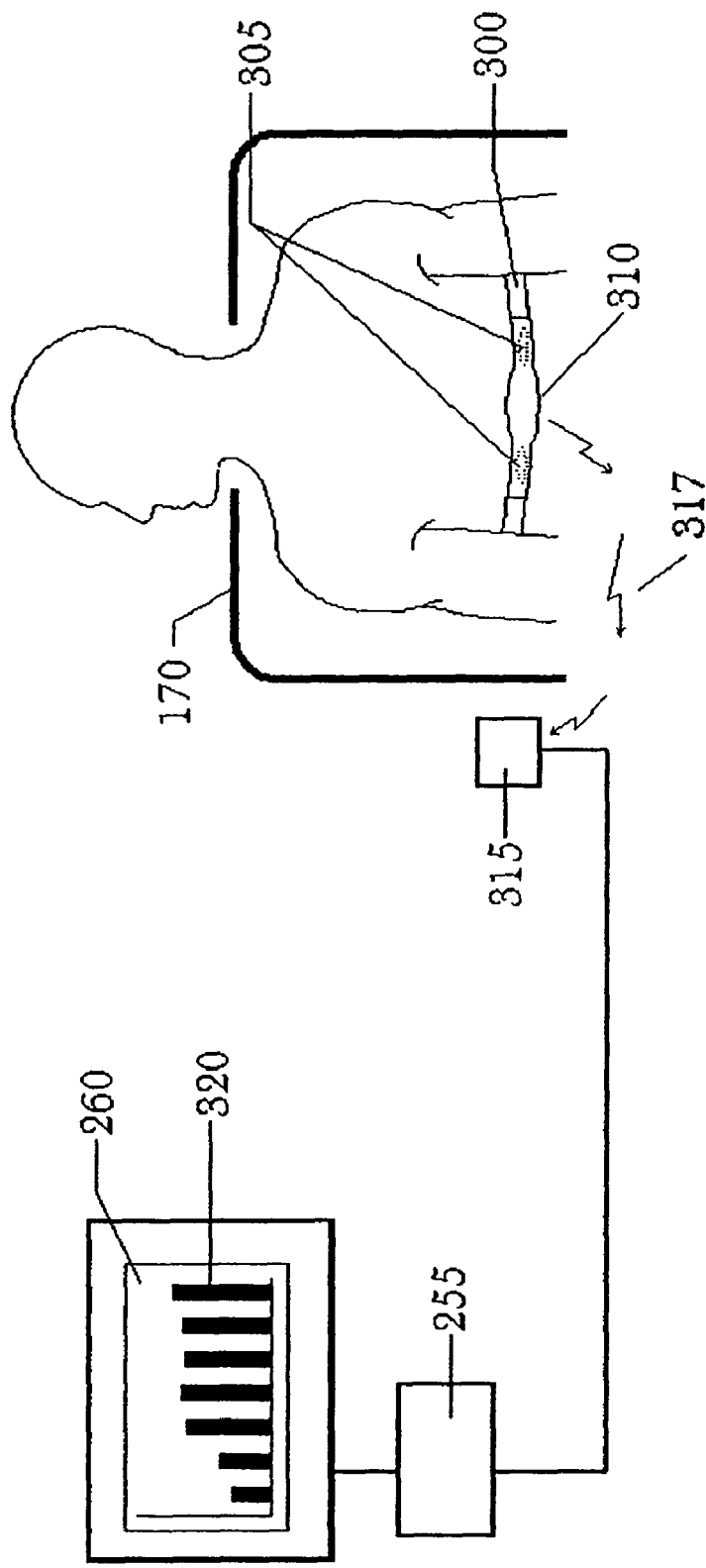
FIG. 5 is partial flow diagram of a heart rate sensor, wireless transmitter and wireless receiver of the present invention.

The touch screen display panel 260 can be adapted to display the instantaneous heart rate in digital format. As shown in FIG. 5, the display CPU 255 can be adapted to instruct the touch screen display panel 260 to display the heart rate in graphical chart format over a period of time. For example, the touch screen display panel 260 may display a bar graph chart where each vertical bar 320 indicates the user's average heart rate over a 5 minute period. The vertical bars are cumulatively added side by side to the graph as the spa cycle progresses through each successive 5 minute period. It will be appreciated that the chest strap 300, heart rate sensor 305, wireless transmitter 310 and wireless receiver 315 are all commercially available.

While the benefits of an aerobic workout may be maximized if the aerobic spa system is adapted to cause ozonated water to contact the user's skin, it will be appreciated that the user may benefit from an aerobic workout in the aerobic spa system of the present application without ozonated water so long as the user's skin is exposed to steam or heat from another source.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicant's contribution. The actual scope of the protection sought is intended to be defined in the following claims when viewed in their proper perspective based on the prior art.

The invention claimed is:

1. An aerobic spa system comprising:
    a chamber for enclosing a user and having a water inlet and a water outlet;
    a water source feeding a supply of water into a first water filter system;
    a first pump fluidly coupled to the water outlet of the chamber and directing flow of water from the outlet and from the first water filter system through a second water filter system;
    a water heater for heating the supply of water, the water heater having an inlet coupled to both the first and the second water filter systems, and an outlet;
    an ozone source fluidly coupled to the outlet of the water heater and for providing a supply of ozone;
    an ozone introduction mechanism which introduces the supply of ozone into the supply of heated water to form a first mixture;
    an ozone saturation mechanism coupled to an outlet from the ozone introduction mechanism, the saturation mechanism moving and mixing the first mixture to allow undissolved ozone in the first mixture to be dissolved into the water;
    a degassing assembly coupled to an outlet of the ozone saturation mechanism for removing undissolved ozone from the first mixture to form a second mixture;
    an ozone destruction mechanism fluidly coupled to an ozone discharge outlet of the degassing assembly to destroy undissolved ozone removed from the first mixture; and
    a first water jet for injecting the second mixture into the chamber in a manner such that the mixture comes into contact with a user positioned within the chamber.

2. The aerobic spa system of claim 1 wherein the second mixture has an ozone concentration of at least 0.3 milligram ozone per liter of water.

3. The aerobic spa system of claim 1 wherein the filtered supply of water comprises a total dissolved solid level below 10 parts per million.

4. The aerobic spa system of claim 1 further comprising:
    a heart rate monitor sensor disposed on a user inside the chamber and a wireless transmitter coupled to the heart rate monitor;
    a wireless receiver adapted to receive heart rate data signals from the wireless transmitter; and
    a heart monitor display coupled to the wireless receiver and disposed outside the chamber wherein the heart monitor display is adapted to display information related to a user's heart rate.

5. The aerobic spa system of claim 4 further comprising a steam generator and steam conduit adapted to deliver steam to the chamber.

6. The aerobic spa system of claim 1 wherein the chamber is in the form of a shower stall.

7. An aerobic spa system comprising:
    a chamber for enclosing a user and having a water inlet and a water outlet;
    a water source feeding a supply of water directly into a water filter system;
    a water heater for heating the supply of water, the water heater having an inlet coupled to the water filter system, and an outlet;
    an ozone source fluidly coupled to the outlet of the water and for providing a supply of ozone;
    an ozone introduction mechanism which introduces the supply of ozone into the supply of heated water to form a first mixture;
    an ozone saturating mechanism coupled to an outlet from the ozone introduction mechanism, the saturation mechanism moving and mixing the first mixture to allow undissolved ozone in the first mixture to be dissolved into the water whereby the ozone concentration in the first mixture is at least 0.3 milligram ozone per liter of water;
    a degassing assembly coupled to an outlet of the ozone saturation mechanism for removing undissolved ozone from the first mixture to form a second mixture;
    a first ozone destruct mechanism fluidly coupled to an ozone discharge outlet of the degassing assembly to destroy ozone exiting the degassing assembly;
    a first water jet disposed inside the chamber for injecting the second mixture in a manner such that the mixture comes into contact with a user positioned within the chamber; and
    a second ozone destruction mechanism dissipating ozone exiting the chamber, the mechanism being positioned adjacent an opening of the chamber such that ozone is kept from being inhaled by a user positioned within the chamber.

8. The aerobic spa system of claim 7 wherein the first ozone destruct mechanism comprises a chamber packed with substantially porous material.

9. The aerobic spa system of claim 7 wherein the second ozone destruct mechanism comprises a fan and a grill comprised of substantially porous material.

10. The aerobic spa system of claim 7 further comprising a steam generator and steam conduit adapted to deliver steam to the chamber.

11. The aerobic spa system of claim 7 wherein the water filter system comprises a deionization filter.

12. The aerobic spa system of claim 11 wherein the water filter system further comprises a second deionization filter.

13. The aerobic spa system of claim 7 wherein the supply of water comprises deionized water.

14. The aerobic spa system of claim 7 further comprising a central processing unit.

15. The aerobic spa system of claim 14 wherein the central processing unit is adapted to automate the initiation of a spa cycle.

16. The aerobic spa system of claim 15 wherein the central processing unit controls the valve to initiate a cleaning cycle.

17. The aerobic spa system of claim 14 further comprising means for automating control over volume of water in the aerobic spa system based on the volume of water in the chamber.

18. The aerobic spa system of claim 7 further comprising means for preventing the water heater from overheating in an automated manner.

19. The aerobic spa system of claim 7 further comprising a user console adapted to permit the user to control the water heater.

20. The aerobic spa system of claim 19 wherein the user console comprises air pressure buttons.

21. The aerobic spa system of claim 14 further comprising an operator control panel.

22. The aerobic spa system of claim 21 wherein the operator control panel comprises a touch screen display panel.

23. The aerobic spa system of claim 22 wherein the operator control panel is adapted to permit an operator to regulate the desired water temperature and time duration of a spa cycle.

24. The aerobic spa system of claim 7 further comprising:
 a heart rate monitor sensor for contacting a user inside the chamber and a wireless transmitter coupled to the heart rate monitor;
 a wireless receiver adapted to receive heart rate data signals from the wireless transmitter; and
 means for controlling the water temperature in an automated manner based on the user's heart rate data.

25. A method for delivering ozonated water to a user comprising the steps of:
 providing a supply of filtered water;
 providing a supply of ozone;
 heating the supply of filtered water to within a desired temperature range;
 creating ozonated water by (1) introducing the supply of ozone into the heated supply of filtered water using an ozone introduction mechanism, and (2) dissolving at least some of the supply of ozone in the heated supply of filtered water using an ozone saturation mechanism having an outlet;
 separating undissolved ozone from the ozonated water in a degassing assembly coupled to the outlet of the ozone saturation mechanism to create a mixture;
 preventing inhalation of unsafe levels of ozone using an ozone destruction mechanism;
 injecting the mixture into a chamber; and
 allowing the mixture to contact the skin of a user inside the chamber.

26. The method of claim 25 further comprising the steps of recirculating and reintroducing ozone into water that exits the chamber.

27. An aerobic spa system comprising:
 a chamber for enclosing a user and having a water inlet and a water outlet;
 a water source feeding a supply of water into a water filter system;
 an ozone source fluidly coupled to the water source and for providing a supply of ozone;
 an ozone introduction mechanism which introduces the supply of ozone into the filtered supply of water to form a first mixture;
 an ozone saturation mechanism coupled to an outlet from the ozone introduction mechanism, the saturation mechanism moving and mixing the first mixture and allowing undissolved ozone in the first mixture to be dissolved into the water; and
 a degassing assembly coupled to an outlet of the ozone saturation mechanism for removing undissolved ozone from the first mixture to form a second mixture;
 wherein the water inlet of the chamber comprises:
  a first water jet for injecting the second mixture into the chamber in a manner such that the mixture comes into contact with a user positioned within the chamber;
  a second water jet for injecting the second mixture into the chamber in a manner such that the mixture comes into contact with chamber interior surfaces for cleaning; and
  a valve for switching a flow of the second mixture between one of either the first water jet and the second water jet.

28. The aerobic spa system of claim 27, further comprising a first ozone destruct mechanism fluidly coupled to an ozone discharge outlet of the degassing assembly to destroy ozone exiting the degassing assembly.

29. The aerobic spa system of claim 28, further comprising a second ozone destruction mechanism for dissipating ozone exiting the chamber, the mechanism being positioned adjacent an opening of the chamber preventing unsafe levels of ozone from being inhaled by a user positioned within the chamber.

30. A method for delivering ozonated water to a user comprising the steps of:
 providing a supply of filtered water;
 providing a supply of ozone;
 heating the supply of filtered water to within a desired temperature range;
 creating ozonated water by (1) introducing the supply of ozone into the heating supply of filtered water using an ozone introduction mechanism, and (2) dissolving at least some of the supply of ozone in the heated supply of filtered water using an ozone saturation mechanism having an outlet;
 separating undissolved ozone from the ozonated water in a degassing assembly coupled to the outlet of the ozone saturation mechanism to create a mixture;
 destroying undissolved ozone separated from the ozonated water using a first ozone destruction mechanism;
 opening a valve to inject the mixture into a chamber, and either:
  i. directing the mixture thought a jet in the chamber to contact the skin of a user inside the chamber; or
  ii. directing the mixture through a jet in the chamber to contact interior surfaces of the chamber to clean the chamber.

31. The method of claim 30, further comprising the steps of recirculating and reintroducing ozone into water that exits the chamber.

32. The method of claim 30, further comprising the step of preventing inhalation of unsafe levels of ozone by a user.

* * * * *